March 3, 1959 H. GROSS ET AL 2,875,686
CASH REGISTERS
Filed Jan. 24, 1956 5 Sheets-Sheet 1

INVENTORS
HENRY GROSS & SAMUEL GROSS
BY
Young, Emery & Thompson
ATTORNEYS

March 3, 1959

H. GROSS ET AL 2,875,686

CASH REGISTERS

Filed Jan. 24, 1956

INVENTORS
HENRY GROSS & SAMUEL GROSS
BY
Young, Emery & Thompson
ATTORNEYS

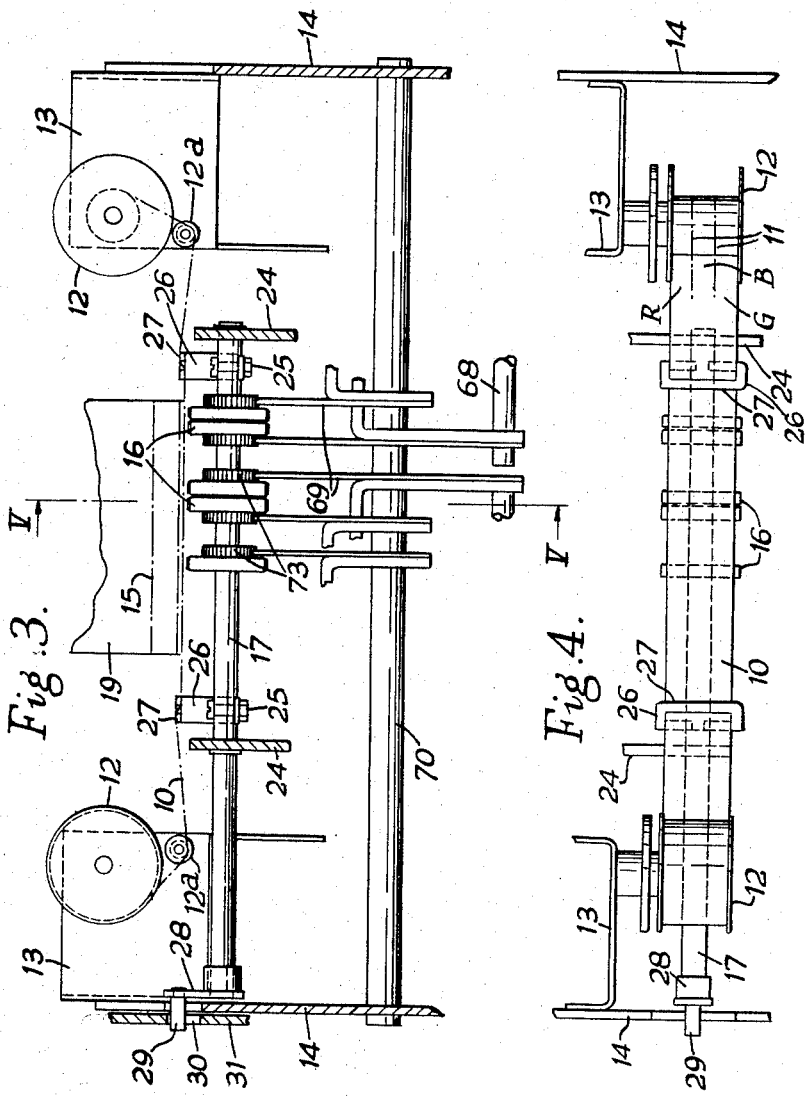

March 3, 1959

H. GROSS ET AL 2,875,686

CASH REGISTERS

Filed Jan. 24, 1956

INVENTORS
HENRY GROSS & SAMUEL GROSS
BY
Young, Emery & Thompson
ATTORNEYS

United States Patent Office 2,875,686
Patented Mar. 3, 1959

2,875,686
CASH REGISTERS

Henry Gross and Samuel Gross, London, England

Application January 24, 1956, Serial No. 561,104

Claims priority, application Great Britain February 1, 1955

6 Claims. (Cl. 101—96)

This invention relates to manually or electrically operable cash registers and other adding machines of the kind having the usual banks of amount keys or the like, and which may have other special transaction keys such as "No Sale," "Paid Out," "Paid on Account" and operators' keys, and also having a printing unit comprising a platen, type elements such as bars or wheels which are driven through distances corresponding to the actuated amount keys, and ink-carrying means by which the amount set up on the type elements is automatically printed on a paper record strip for each operation of the machine.

Hitherto, it has been customary, when one or any of the special transaction keys is actuated, to indicate on the record strip, in a single colour, e. g. black or purple, the nature of the transaction or operation by means of appropriate symbols such as letters, numbers or signs, e. g. an asterisk. The present invention has for its object a cash register in which, by means of a printing unit using a multi-colour inking means, any desired transaction, which may usually be a special transaction but may be simply a cash transaction, or may be each of the transactions effected by one of a number of operators, can be recorded on the paper strip in a colour which is different from that in which the transactions are normally printed, or in any one of a number of selective colours.

According to the invention, a cash register or other adding machine of the kind referred to comprises ink-carrying means having two or more parts of different colours, said ink-carrying means and the type elements being relatively displaceable to positions in which the different colour parts of the ink-carrying means are respectively presented to the type elements, manually operable means for selecting at least all but one of the different colour positions, and means to prevent printing in the colour corresponding to any one of the selective positions until the selecting means has been actuated.

In one form of the invention, a cash register or other adding machine of the kind referred to is provided with manually operable means for effecting relative displacement of the type elements and the multi-colour ink-carrying means from a position in which one colour part of said ink-carrying means is operatively disposed in relation to the type elements to a position in which another color part of said ink-carrying means is similarly disposed, thereby to enable any transaction or operation to be recorded on the paper strip in said other colour, and means for thereafter automatically restoring the type elements and ink-carrying means to the first-mentioned position at least before the next printing operation takes place.

In another form of the invention, a cash register or other adding machine of the kind referred to comprises ink-carrying means having two or more parts of different colours, the ink-carrying means and the type elements being relatively displaceable to positions in which the different colour parts of said ink-carrying means are respectively presented to said type elements, manually operable means for selecting the different relative positions of the ink-carrying means and the type elements, and means to prevent operation of the machine until said selecting means has been actuated.

The ink-carrying means may comprise an inking ribbon having different colour strips and the said relative displacement may be effected by transversely moving a part of the inking ribbon extending between the usual supply and take-up spools, said ribbon part extending parallel to the axis or plane of the type elements. This movement of the ribbon may be effected by the actuation of a lever pivoted in the machine and having a number of different operative positions corresponding to the number of colour strips on the ribbon.

The lever may be provided with resilient centralising means and a latch bar retains the lever in the desired operative position during the printing operation, said latch bar being movable to free said lever so that it will return to its central position after the printing operation has been completed. Alternatively, the lever may have a neutral position to which it is resiliently moved after each operation, said movement permitting the engagement with a movable element of the machine of a latch bar thereby to lock the machine against operation. The latch bar is removed from the locking position concurrently with the operation of the lever in selecting the next colour. In still another form the lever may remain in the last selected colour position until it is again actuated to select the next colour, the latch bar becoming operative when the machine completes its operation and being released by the action of selecting the next colour.

The lever may have a handle projecting through the machine casing or may be actuated through the medium of push buttons. These push buttons may be the different operators' code buttons already provided in some types of cash register so that the code sign, letter or number is printed in the same colour as the transactions entered by each operator. Alternatively, each operator may be able to select each of the different colours provided.

The invention is illustrated by way of example in the accompanying drawings, which show two different embodiments. In said drawings:

Figure 3 is a detail front elevation in the direction of arrow A in Figure 1;

Figure 4 is a plan view of Figure 3;

Figure 1:
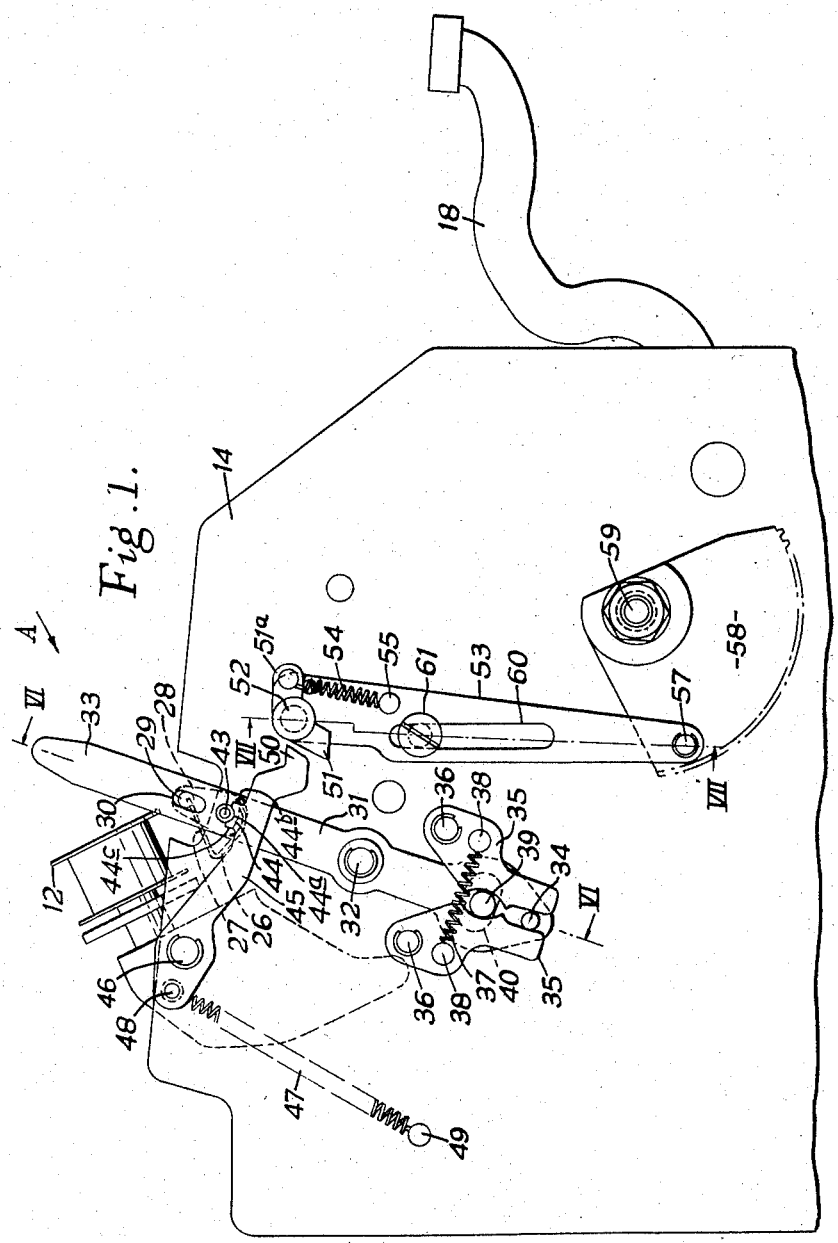
Figure 1 is a side elevation of part of a cash register fitted with colour printing means providing one basic colour and two selective colours; the machine being shown set for printing in the basic colour.

Referring to the drawings, 10 designates an inking ribbon having three longitudinal strips or areas B, G and R of equal width and carrying ink of three different colours, e. g., black, green and red respectively, separation of the colour strips from one another being illustrated in Figure 4 by chain lines 11. The ribbon is carried in customary manner on a pair of flanged spools 12 and guide rolls 12a rotatably mounted in brackets 13 extending inwardly from the side frames 14 of the machine casing, and any known or convenient means (not shown)

Figure 5:
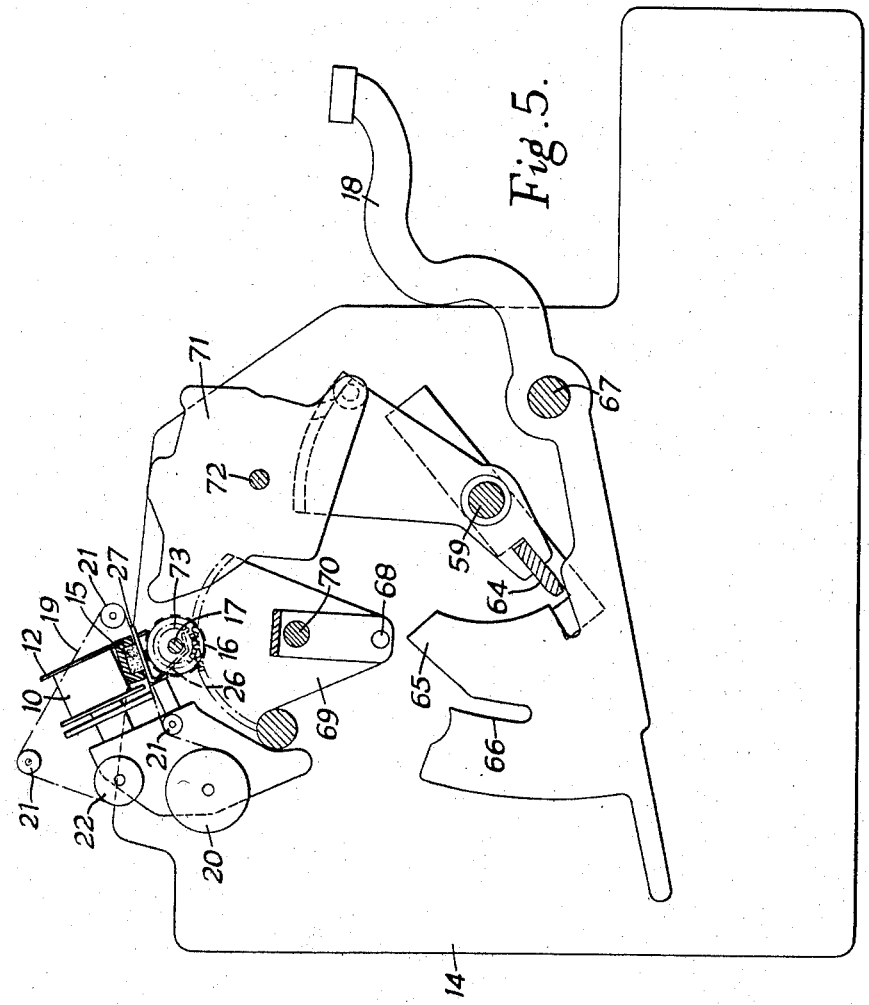
Figure 5 is a sectional view of the machine to a reduced scale, partly on line V—V of Figure 3.

} may be provided for feeding the ribbon incrementally from one spool to the other upon each operation of the machine. The ribbon passes between a platen 15 (Figure 5) and a plurality of type wheels 16 freely rotatable on a transverse shaft 17. There are as many type wheels 16 as there are banks of amount key levers 18 (only one of which is shown) in the machine, and in the illustrated embodiment five type wheels are provided, the right-hand pair (Figures 3 and 4) denoting pence and fractions of a penny, the centre pair denoting units of shillings and 10/—, and the left-hand wheel denoting units of pounds. A paper strip 19 (Figures 3 and 5) leading from a supply spool 20 and over guide rolls 21 to a storage roll 22 passes between the platen 15 and the ribbon 10. The platen is moved in known manner towards the type wheels when the machine is operated to produce a type impression on the paper and the latter also is advanced incrementally by any known or convenient means (not shown) after each operation.

The shaft 17 carrying the type wheels 16 is journalled in a pair of stationary supporting brackets 24 and has secured thereto by bolt 25 a pair of U-shaped arms 26 one side limb 27 of each of which is slotted to provide a guide for the ribbon 10. The portion of the ribbon between the guides is parallel to the shaft 17. One end of the shaft 17 is connected to a crank arm 28 carrying a pin 29 engaging in an elongated slot 30 in a lever 31 pivoted at 32 in the adjacent side part 14 of the machine frame. The lever 31 is formed at its upper end with a handle 33 projecting through the front wall (not shown) of the machine casing and at its lower end carries a stud 34 with which are engageable the free ends of a pair of levers 35 pivoted at 36 on the side frame 14 at opposite sides of the lever 31. A tension spring 37 extending between pins 38 on said levers 35 tends to hold the levers in contact with the stud 34 and thus to centralise the lever 31. A pin 39 on the side frame 14 engages in a slot 40 provided in the lever 31 to limit rocking movement of the lever about its pivot 32.

Adjacent the pin 29 the lever 31 carries another pin 43 cooperating with an upstanding projection 44 on a latch bar 45 pivoted at 46 on the side frame 14. A tension spring 47 extending between a pin 48 on one end of the latch bar and an anchorage 49 on the side frame 14 holds the latch bar resiliently in engagement with the pin 43. The end of the latch bar 45 remote from the pivot 46 is formed with a nose 50 with which is engageable a pawl 51 pivoted at 52 on the upper end of a link 53 and urged, by a spring 54 extending between a pin on the tail 51a of the pawl and an anchorage 55 on link 53, against a stop pin 56 (see Figure 2). The link 53 is pivotally connected at its lower end at 57 to a quadrant 58 secured to a shaft 59 extending across the machine and journalled in bearings in the side frames 14. The link 53 is formed with an elongated slot 60 which receives a guide stud 61 fixed in the side frame 14.

The quadrant 58 is given an oscillatory movement, first turning in the clockwise direction and then in the counter-clockwise direction, during each operation, and for this purpose the shaft 59 is conveniently that on which the usual coupler bar or universal 64 (Figure 5) is carried. The construction of the coupler bar and the key levers 18 in the machine illustrated is substantially identical with that shown in our United States Patent No. 2,509,493. Thus the key levers are provided near their rear ends with cam faces 65 and slots 66 which latter are concentric with the shaft 67 on which the key levers are journalled, and these cam faces and slots engage with pins 68 on quadrants 69 pivoted on a shaft 70 carried in the side frames 14. The quadrant movements are imparted to the adding wheels (not shown) of an adding unit 71 rockably mounted at 72 and also engage pinions 73 rigid with the type wheels 16, so that said type wheels are rotated during each operation of the machine through the same distances as the corresponding adding wheels.

The printing unit mechanism described operates in the following manner.

With the lever 31 in its central position as shown in Figure 1 the amount of each transaction will be printed, during operation of the machine, in the colour corresponding to the central strip B of the ribbon 10, i. e., in black. As the coupler bar 64, shaft 59 and quadrant 58 are rocked during each operation, the link 53 will be reciprocated relatively to the guide stud 61 and the pawl 51 on said link will be rocked idly by engagement with the latch bar nose 50 during the upward movement of said link from the rest position shown in Figure 1. During the return movement of the link the latch bar 45 will be rocked by the pawl 51 in the clockwise direction about its pivot 46 and after being released from the pawl, it will return under the action of spring 47 to its upper position determined by the pin 43. As the lever 31 is resiliently held by spring 37 and the centralising levers 35 in the position shown, a recess 44a in the top of the projection 44 on the latch bar will re-engage with the pin 43. For this reason the amount of each transaction set up in the machine will be printed in black as long as the position of lever 31 remains unchanged.

Figure 2:
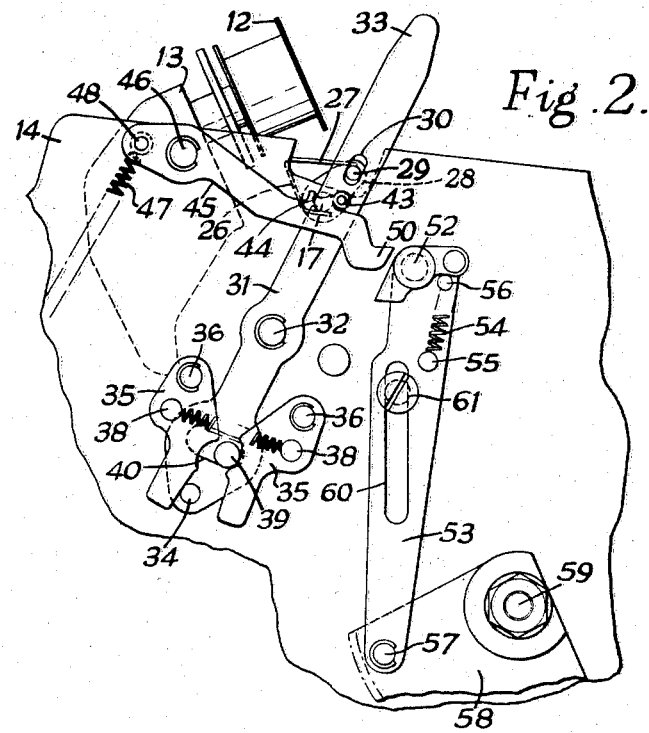
Figure 2 is a partial view similar to Figure 1 but set for printing in one of the selective colours.
Figure 6:
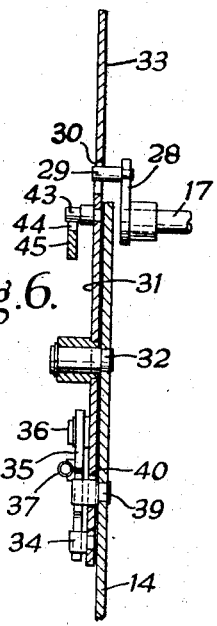
Figure 6 is a detail section on line VI—VI of Figure 1.
Figure 7:
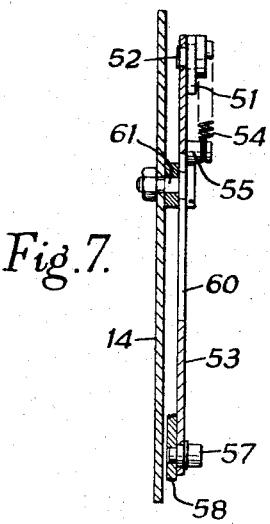
Figure 7 is a detail section on line VII—VII of Figure 1.

When it is desired to print the amount of a transaction in red, the handle 33 of lever 31 is pulled forwardly, i. e. towards the keys, until the pin 43 clears the projection 44 on the latch bar 45. During this movement the shaft 17 is rocked so that the ribbon guides 27 present the red ribbon strip R to the type wheels. As shown in Figure 2, the latch bar is then rocked by its spring 47 in the counter-clockwise direction to the extent permitted by pin 43, which now engages, under the centralising effect on the lever produced by spring 37 and levers 35, in the angle formed by the front face 44b of the projection 44 with the top face of the latch bar, thus locking lever 31 against return to the position of Figure 1. As the link 53 is moved upwardly during operation of the machine, the pawl 51 again passes freely beyond the nose 50 of the latch bar, but as said link returns to its rest position the pawl rocks the latch bar in the clockwise direction out of engagement with the pin 43. Lever 31, thus being freed, is now returned to its central position and towards the conclusion of the operation the recess 44a in the latch bar projection 44 re-engages with the pin 43 as shown in Figure 1.

It will be evident from Figures 1 to 7 that rocking of the lever 31 in the rearward direction from the position shown in Figure 1 will cause the pin 43 to engage in the angle formed by the rear face 44c of the projection 44 with the top face of the latch bar, and will present the green ribbon strip G to the type wheels so that, on operation of the machine, the pawl 51 will again release the latch bar 45 and the lever will be returned to its central position before the machine is next operated. Thus it follows that the transactions entered into the machine will be printed in a single colour, e. g. black, so long as the position of lever 31 remains unchanged, and that, upon actuation of said lever to effect a change in colour, e. g. to red or green, only one transaction will be printed in the selected colour, the lever returning automatically to the position for printing in black before the next following operation of the machine. Due to the fact that the type wheels 16 and the ribbon guides 27 are mounted on a common axis, and to the particular construction of said guides, that portion of the ribbon extending between the guides will always lie tangentially of the type wheels irrespective of the position of lever 31.

While in this embodiment the machine employs a three-colour ink-carrying ribbon, it will be evident that a ribbon having two, four or more colour strips may be used. In the case of a colour strip having four or more colours it will simply be necessary to provide an additional operative position of the lever 31 for each additional colour. This can be quite easily effected by providing one or more additional projections 44 on the latch bar or by suitably modifying the single projection shown.

Figure 8:
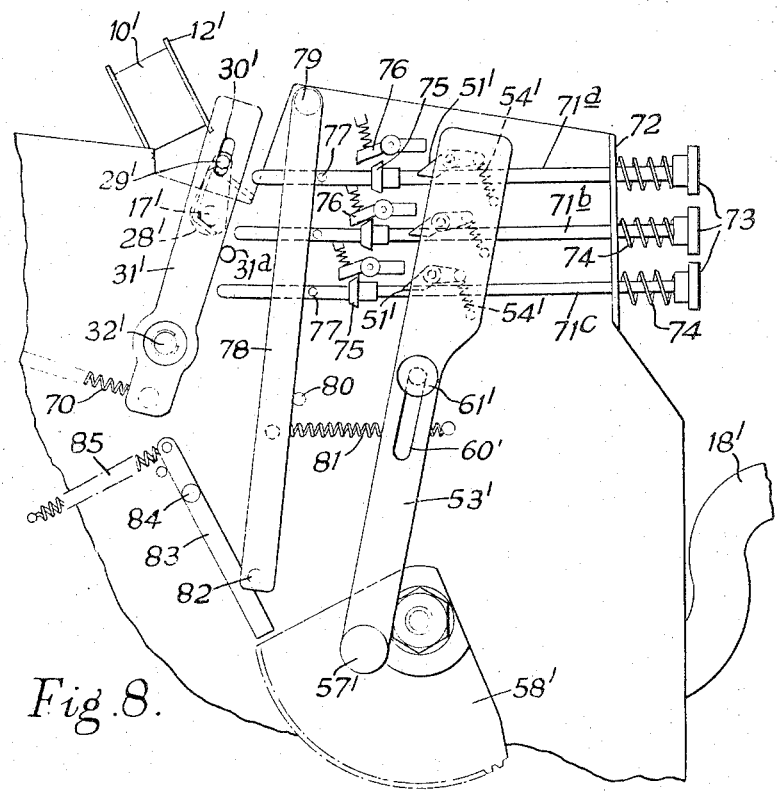
Figure 8 is a fragmentary side elevation of a cash register having three selective colour positions and a neutral (non-printing) position, the printing unit being shown in the neutral position.
Figure 9:
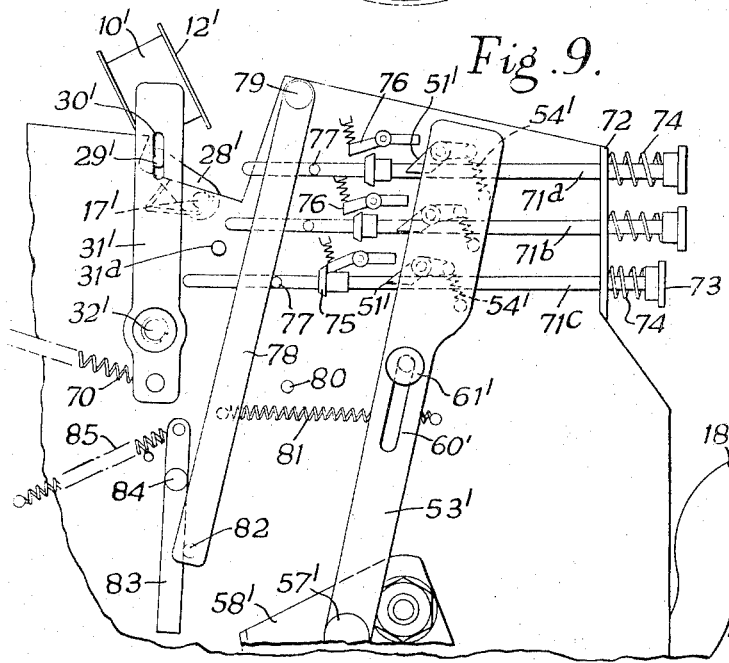
Figure 9 is a view similar to Figure 8 showing the printing unit in one of the selective colour printing positions.

In the construction illustrated in Figures 8 and 9, which show only those features which are essential to its understanding, the ribbon 10' again has three longitudinal strips or areas of different colours and is carried by spools 12' (only one being shown) as in the earlier embodiment. The shaft 17' is similarly supported in the machine and is coupled through a crank arm 28', pin 29' and slot 30' to a lever 31' pivoted at 32' in the machine. This lever, instead of being resiliently centralised as in the previous construction, is urged by a tension spring 70 in the clockwise direction so as normally to occupy the position shown in Figure 8, which is a neutral position in which no colour part of the ribbon is presented to the type wheels (not shown). Cooperable with the lever 31' are three rods 71a, 71b and 71c, supported for axial movement in a bracket 72 carried by the machine frame, said rods extending outside the casing at the end remote from the lever 31' and being provided with an actuating button 73. Springs 74 interposed between the bracket 72 and the buttons 73 normally hold the rods retracted from the lever 31'.

Each rod 71a, 71b, 71c carries a projection in the form of a collar 75 engageable with a detent pawl 76 pivoted in the machine, and each pawl is formed with a tail which is engageable with one of three trip pawls 51' pivoted on the link 53' connected at its lower end at 57' to the quadrant 58'. The link is guided for reciprocal movement by pin 61' and slot 60', and springs 54' hold the trip pawls 51' in positions to engage the corresponding tails of the detent pawls 76 during movement of said link. Each of the rods carries a lateral projection 77 which is engageable with an arm 78 pivoted at its upper end at 79 on the machine frame and normally held against a stop 80 by a tension spring 81. The arm 78 carries a pin 82 at its lower end which is engaged by a latch bar 83 pivoted in the machine at 84 and urged by a tension spring 85 so that its lower end is normally located in the path of movement of the quadrant 58'.

In the rest position of the machine shown in Figure 8, the lever 31' is held in the neutral position, determined by a stop 31a, by the spring 70, in which position the machine is locked against operation by the latch bar 83, in addition to which the ribbon is positioned so that none of its colour strips lies between the type wheels and the platen. To release the machine, one of the buttons 73 is pressed to cause its rod to rock lever 31' to the position corresponding to the colour in which the next transaction is to be recorded. Assuming, for example, that the three different colour parts of the ribbon occupy the same positions, relative to the machine, as in the earlier embodiment, and that all the rods 71a, 71b, 71c have equal operative movements, the uppermost rod 71a, being located furthest from the lever axis 32' and therefore producing the smallest movement of lever 31', will correspond to the red ribbon strip. The rod 71b then corresponds to the black ribbon strip and the rod 71c, which produces the greatest movement of the lever, corresponds to the green ribbon strip.

When one of the rods is actuated to select the required colour, it is held in the operative position by the engagement of the projection 75 thereon with the associated pawl 76. During this movement the arm 78 is rocked to remove the latch bar 83 out of the path of movement of the quadrant and the machine is free to operate. When thereafter the appropriate key levers 18' are operated by depressing their keys the link 53' is first moved upwardly, the pawls 51' being rocked idly by their engagement with the tails of pawls 76. As the link 53' returns to its lower position upon release of the depressed keys, the pawls 51' rock the associated detent pawls 76 in the clockwise direction so that the operated rod is released and returns to its inoperative position under the action of its spring 74. The lever 31' is then free to return to the neutral position. The machine is shown in readiness for operation in Figure 9, the lowermost rod 71c being shown in the operative position to record the next transaction in green, and the latch bar 83 being in the inoperative position.

It will be evident from the foregoing that each of the colour positions is selective, and the operator has to press one of the buttons 73 before each operation of the machine. This ensures that, with this construction, inadvertent recording of successive transactions in the same colour, due to the operator omitting to make the desired colour selection, is impossible. Obviously the number of different colour positions provided may alternatively be two, four or more.

Instead of providing a neutral position to which the ribbon is returned after each operation, the arrangement may be such that the ribbon remains in the position corresponding to the last colour used, the machine nevertheless being locked at the end of each operation. With this arrangement also it is necessary to select one of the colours by actuating the appropriate button, so that repeated printing in any one colour is impossible unless that colour is selected for each opertaion.

While both embodiments of cash register illustrated in the drawings are of the manually operable or "press down" kind, in which the printing unit normally includes type wheels as above described, the invention is equally suitable for use in electrically operated cash registers, where the type elements may consist of type bars. It is also possible to employ other kinds of ink-carrying means, such as an ink fountain and transfer roller. Moreover, instead of being used to print different transactions in different colours, the invention may be arranged to print the code signs, numbers or letters of a number of operators each in a different colour, or to combined different transactions with different operators. In the latter case, assuming a different colour for each of three different classes of transaction, and three different operators, nine push buttons would be required, three for each operator, of which only one is actuated for each operation of the machine.

We claim:

1. In an adding machine of the class described having an adding mechanism and actuating amount keys, the combination of printing means including a platen, an ink carrier having parts thereof of different colours, type elements movable in dependence upon the actuation of the amount keys, means carrying a detail strip on which the amounts set up on the type elements are printed during each operation of the machine, means to advance the detail strip after each printing operation, manually operable colour-selecting means to effect relative displacement of said type elements and ink carrier to present at least all but one of the different colour parts of the ink carrier to the type elements, and means to prevent printing in any selectable colour until the colour-selecting means has been actuated.

2. In an adding machine of the class described having an adding mechanism and actuating amount keys, the combination of printing means including a platen, an ink-carrying ribbon having parts thereof of different colours, type elements movable in dependence upon the actuation of the amount keys, means carrying a detail strip on which the amounts set up on the type elements are printed during each operation of the machine, means to advance said detail strip after each printing operation, manually operable colour-selecting means to effect relative displacement of said type elements and ink-carrying ribbon from a position in which one colour part of the ink-carrying ribbon is operatively disposed in relation to the type elements to a position in which another colour part of the ink-carrying ribbon is similarly disposed, and means to prevent operation of the machine until said colour-selecting means has been actuated.

3. An adding machine as claimed in claim 2, in which the ink-carrying ribbon has a plurality of strips of different colours extending longitudinally thereof, comprising a rotatable shaft, type wheels freely mounted on said shaft, guides secured to said shaft and engaging a portion of said ribbon extending parallel to said shaft, a lever on said shaft, means resiliently urging said lever to a predetermined position in which the ribbon is out of registration with the type wheels, a plurality of manually operable rods to move said lever to different positions corresponding to the different colour strips in the ribbon, means to lock the machine against operation until one of said rods has been actuated to move the lever to a position corresponding to one of the ribbon colour strips, and means to re-engage said lock, after each printing operation.

4. An adding machine as claimed in claim 2, in which the ink-carrying ribbon has a portion thereof extending parallel to the type elements and is provided with a plurality of longitudinal strips of different colours, and in which a pivoted coupler is actuated during each operation of the machine, comprising a lever movable to a plurality of different selective positions corresponding to the number of colour strips in the ribbon thereby to present the different colour strips to the type elements, means resiliently urging said lever to a predetermined position in which the ribbon is out of registration with the type elements, a plurality of manually operable rods to move said lever to different positions corresponding to the different colour strips in the ribbon, a latch engageable with said coupler to lock the machine against operation when the ribbon is out of registration with the type elements, means on each of said rods to release said latch from the locking position upon actuation of the rod to move the lever to one of its selective colour positions, means to retain the actuated rod in its operative position until after the printing operation, and means operative upon return of said rod to its inoperative position to return the latch to the locking position.

5. In an adding machine of the class described having an adding mechanism and actuating amount keys, the combination of printing means including a platen, an ink-carrying ribbon having a plurality of strips of different colours extending longitudinally thereof, a rotatable shaft, type wheels rotatable on said shaft in dependence upon the actuation of the amount keys, guides secured on said shaft and engaging a portion of said ribbon extending parallel to the shaft, means carrying a detail strip on which the amounts set up on the type wheels are printed during each operation of the machine, means to advance the detail strip after each printing operation, a manually operable lever to rotate said shaft so as to effect displacement of the ribbon relative to the type wheels from a position in which one of said colour strips is operatively disposed in relation to the type wheels to a position in which another of said colour strips is similarly disposed thereby to print any of the amounts set up on the type wheels in said other colour, means to retain said lever in any one of a plurality of positions corresponding to the number of different colour strips in the ribbon, and means thereafter to automatically restore the ribbon to the first-mentioned position before the next succeeding printing operation.

6. In an adding machine as claimed in claim 5, means resiliently urging the said lever to a position corresponding to the first-mentioned position of the ribbon, a pin on the said lever, a pivoted latch bar engageable with said pin to retain said lever in any one of its different positions, and means to disengage said latch bar from said pin after each printing operation.

References Cited in the file of this patent
UNITED STATES PATENTS

| | | |
|---|---|---|
| 1,080,907 | Gatewood et al. | Dec. 9, 1913 |
| 1,800,399 | Page | Apr. 14, 1931 |
| 2,038,716 | Christian | Apr. 28, 1936 |
| 2,088,434 | Racz | July 27, 1937 |